(12) United States Patent
Rigas

(10) Patent No.: US 9,740,029 B2
(45) Date of Patent: Aug. 22, 2017

(54) EYEBLACK GLASS FRAMES

(71) Applicant: Peter Rigas, Yardley, PA (US)

(72) Inventor: Peter Rigas, Yardley, PA (US)

(73) Assignee: Kramden Enterprises, LLC, Dover, DE (US)

( * ) Notice: Subject to any disclaimer, the term of this patent is extended or adjusted under 35 U.S.C. 154(b) by 0 days.

(21) Appl. No.: 14/937,902

(22) Filed: Nov. 11, 2015

(65) Prior Publication Data

US 2016/0139430 A1     May 19, 2016

Related U.S. Application Data

(60) Provisional application No. 62/081,603, filed on Nov. 19, 2014.

(51) Int. Cl.
*G02C 7/16*     (2006.01)
*G02C 5/00*     (2006.01)
*G02C 11/02*     (2006.01)

(52) U.S. Cl.
CPC ............ *G02C 7/16* (2013.01); *G02C 5/001* (2013.01); *G02C 11/02* (2013.01)

(58) Field of Classification Search
CPC .......... G02C 5/001; G02C 5/008; G02C 5/02; G02C 7/101; G02C 7/104; G02C 7/105; G02C 7/108; G02C 7/16; G02C 11/10
USPC ............................................. 351/46, 61, 158
See application file for complete search history.

(56) References Cited

U.S. PATENT DOCUMENTS

| | | | |
|---|---|---|---|
| 5,347,323 A * | 9/1994 | Wilson | G02C 7/02 351/44 |
| D354,502 S | 1/1995 | Mekari | |
| D369,376 S | 4/1996 | Guo | |
| 5,521,655 A | 5/1996 | Rhoad | |
| D396,872 S | 8/1998 | Wang | |
| D396,873 S | 8/1998 | Wang | |
| 7,011,401 B2 | 3/2006 | Markey, III | |
| 7,753,518 B2 | 7/2010 | Lam et al. | |
| D675,248 S | 1/2013 | Iacchetti | |
| 8,828,177 B2 | 9/2014 | Comiskey et al. | |
| 8,998,407 B1 * | 4/2015 | Welt | G02C 7/16 351/45 |
| 2006/0268218 A1 | 11/2006 | Medana | |
| 2013/0208229 A1 | 8/2013 | Polegato Moretti | |
| 2013/0293829 A1 | 11/2013 | Chen | |
| 2013/0314660 A1 | 11/2013 | Chen | |

* cited by examiner

*Primary Examiner* — Huy K Mai
(74) *Attorney, Agent, or Firm* — Joseph E. Maenner; Maenner & Associates, LLC

(57) ABSTRACT

A sun glare reducer provides a right templar portion and a left templar portion. Each of the right templar portion and the left templar portion includes an elongate member having a first free end and a second connected end that connects the elongate member to the facial portion. A facial portion extends between the right templar portion and the left templar portion. The facial portion includes a right under-portion that extends inwardly toward a center of the facial portion from the right vertical portion and a left under-portion that extends inwardly toward a center of the facial portion the left vertical portion. A light absorbing surface extends outwardly away from each of the right under-portion and the left under-portion.

19 Claims, 17 Drawing Sheets

EYEBLACK GLASS FRAMES

CROSS-REFERENCE TO RELATED APPLICATIONS

The present invention claims priority from U.S. Provisional Patent Application 62/081,603, filed on Nov. 19, 2014, and U.S. Provisional Patent Application 62/147,093, filed on Apr. 14, 2014, which are both incorporated herein by reference in their entireties.

BACKGROUND OF THE INVENTION

Field of the Invention

The present invention relates to sunlight absorbing material applied around a user's eyes to reduce sun glare.

Description of the Related Art

Eye black is often used by athletes under their eyes to absorb sunlight and reduce sun glare. Eye black is a waxy substance, similar in texture to lipstick, that is directly applied to the skin underneath the eyes. The eye black must be washed off vigorously to fully remove it from the skin. Additionally, stickers that simulate eye black can be applied under the eyes. These stickers, however, can hurt the user when being removed and are typically only usable one time, and then discarded. It would be beneficial to provide a product that provides the benefit of eye black that is not applied the skin and can be easily and quickly removed by a wearer.

BRIEF SUMMARY OF THE INVENTION

Briefly, the present invention provides a sun glare reducer comprising a right templar portion and a left templar portion. Each of the right templar portion and the left templar portion includes an elongate member having a first free end and a second connected end that connects the elongate member to the facial portion. A facial portion extends between the right templar portion and the left templar portion. The facial portion includes a right under-portion that extends inwardly toward a center of the facial portion from the right vertical portion and a left under-portion that extends inwardly toward a center of the facial portion the left vertical portion. A light absorbing surface extends outwardly away from each of the right under-portion and the left under-portion.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
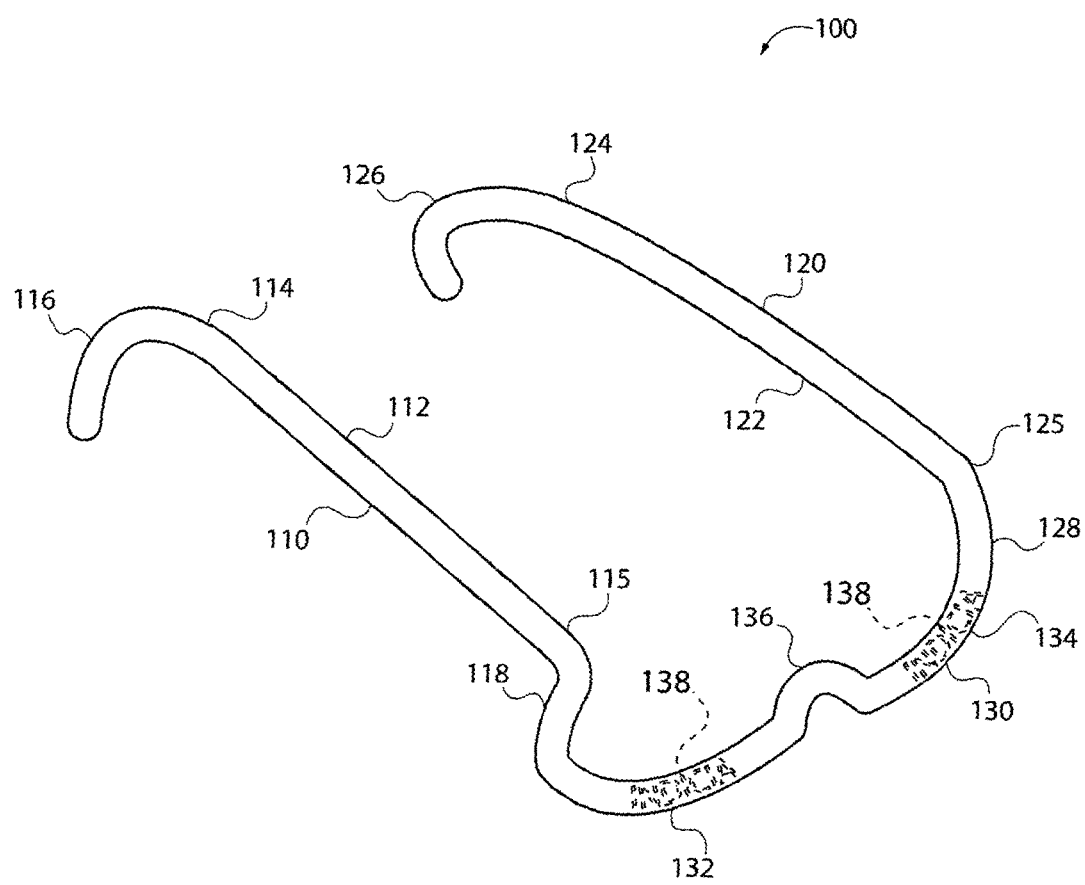
FIG. 1 shows a perspective view of a glare reducer according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "inwardly" means a direction toward the head of the user of the inventive glasses and the term "outwardly" means a direction away from the head of the user of the inventive glasses.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to the Figures, the present invention is used to reduce sun glare. The invention is easily applicable to a user and is also easily removable, without the effort required to remove conventional eye black is applied directly to a user's skin under the eyes.

Figure 2:
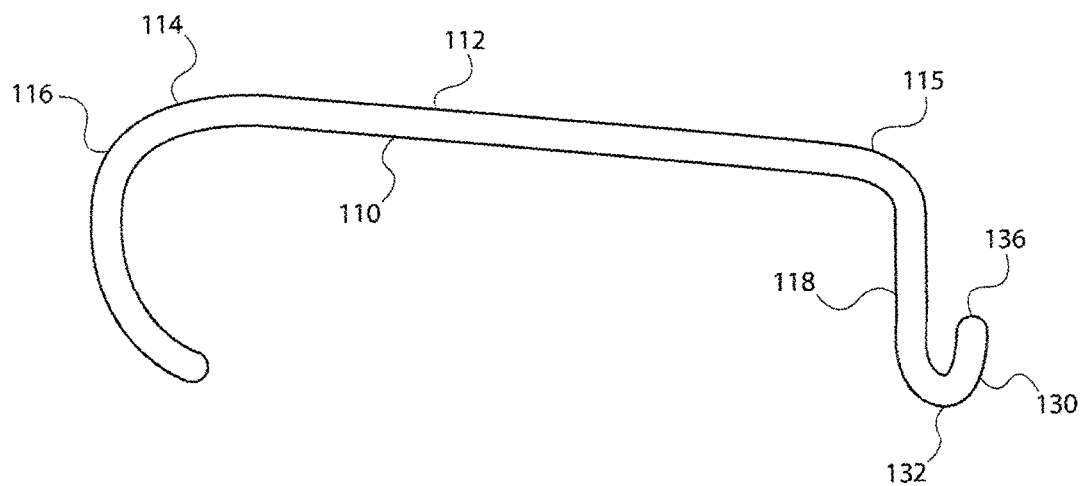
FIG. 2 shows a side elevational view of the glare reducer shown in FIG. 1.
Figure 3:
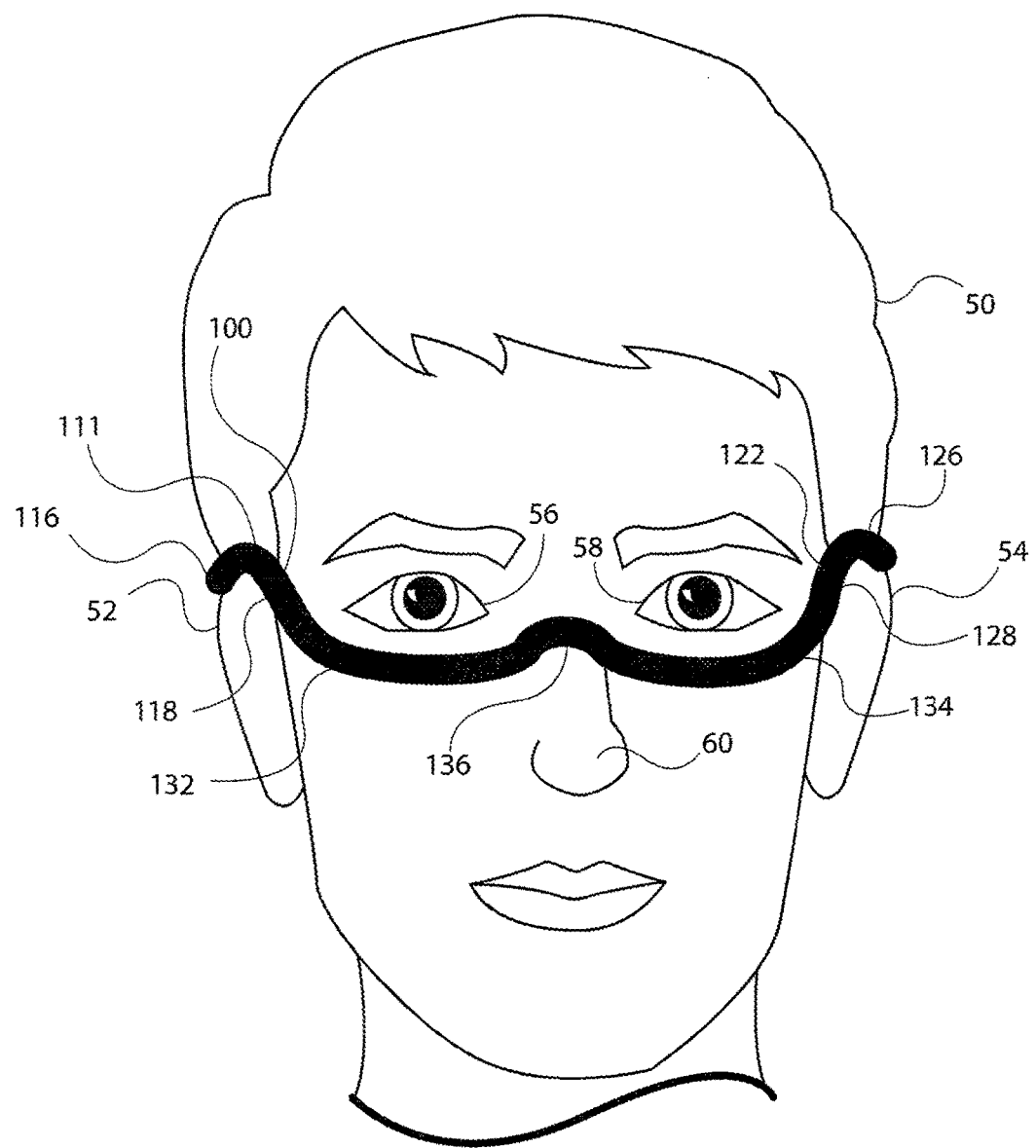
FIG. 3 shows a front elevational view of the glare reducer shown in FIG. 1, being worn by a user.

Referring specifically to FIGS. 1-3, a sun glare reducer 100 according to a first exemplary embodiment of the present invention is shown. Sun glare reducer 100 is similar to conventional eyeglass frames, but does not include lenses that are typically supported by eyeglass frames. The absence of lenses in sun glare reducer 100 allows a user 50 who is already wearing eyeglasses to wear sun glare reducer 100 in addition to the eyeglasses (not shown).

Sun glare reducer 100 includes a right templar portion 110, a left templar portion 120 and a facial portion 130 extending between right templar portion 110 and left templar portion 120.

Right templar portion 110 includes an elongate member 112 having a first end 114 and a second end 115. First end 114 ends in a curved portion 116 that is sized and shaped to fit around the user's right ear 52. Second end 115 ends in a generally vertical portion 118 that connects elongate member 112 to facial portion 130.

Similarly to right temple portion 110, left templar portion 120 includes an elongate member 122 having a first end 124 and a second end 125. First end 124 ends in a curved portion 126 that is sized and shaped to fit around the user's left ear 54. Second end 125 ends in a generally vertical portion 128 that connects elongate member 122 to facial portion 130.

Facial portion 130 includes a right under-portion 132 that extends inwardly toward a center of facial portion 130 from vertical portion 118. Facial portion 130 also includes a left under-portion 134 that extends inwardly toward a center of facial portion 130 from vertical portion 128. Right under-portion 132 and left under-portion 134 are each generally at least slightly concave in shape to fit under a user's right and left eyes 56, 58, respectively.

A nose bridge 136 extends upwardly from right under-portion 132 and left under-portion 134, connecting right under-portion 132 and left under-portion 134. Nose bridge 136 is sized to fit over and on the bridge of a user's nose 60. Optionally, although not shown, nose bridge 136 can include nose pads that rest on user's nose 60 to provide additional comfort to user 50.

Optionally, either one or both of right under-portion 132 and left under-portion 134 can include indicia 138 printed thereon. Indicia 138 can include words and/or artwork. For example, indicia 138 can be the name and/or logo of a sports team. Such indicia would make sun glare reducer 100 attractive to sports fans who may want to emulate their favorite athletes while attending outdoor sporting events.

Additionally, sun glare reducer 100 can be colored. In an exemplary embodiment, the entire sun glare reducer 100 can be a single color, such as, for example, black, in order to absorb a maximum amount of sunlight and reduce glare to the user's eyes 56, 58. Alternatively, sun glare reducer 100 can be a different color, or multiple colors, such as, for example, a sporting team's colors. Similarly to indicia 138, providing sun glare reducer 100 in a sporting teams colors would make sun glare reducer 100 attractive to sports fans who want to show the team colors.

Figure 4:
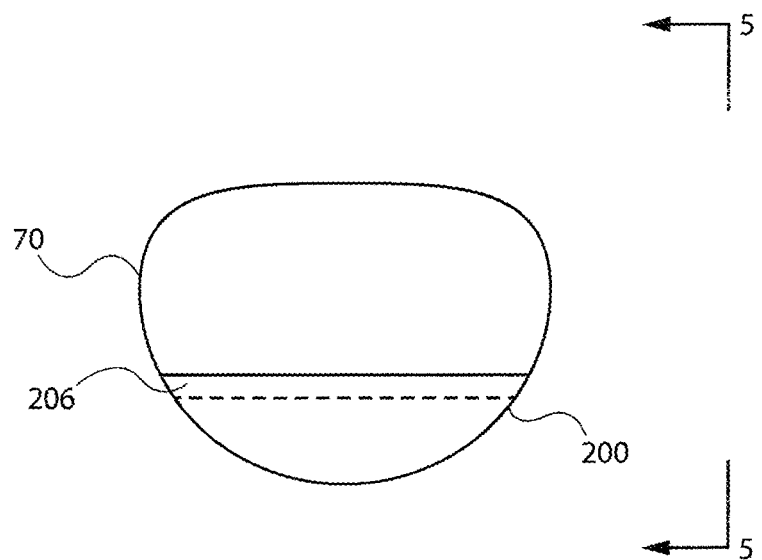
FIG. 4 shows a front elevational view of a glare reducer according to a second exemplary embodiment of the present invention.
Figure 5:
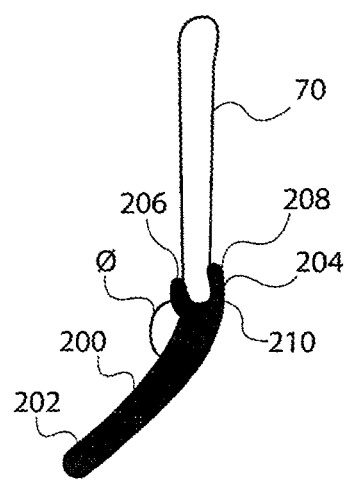
FIG. 5 shows a side elevational view of the glare reducer shown in FIG. 4, taken along lines 5-5 of FIG. 4.

In an alternative embodiment, shown in FIGS. 4 and 5, a sun glare reducer 200 is removably attachable to a glass lens 70. While only a single sun glare reducer 200 is shown, those skilled in the art will recognize that typically, a pair of sun glare reducers 200, one for each lens of a pair of eyeglasses, would be typically worn by a user.

Sun glare reducer 200 includes a generally planar absorbing surface 202. A connecting portion 204 extends at an obtuse angle θ from absorbing surface 202. Angle θ is selected so that absorbing surface 202, extends in front of, but does not necessarily contact, the upper cheeks of a user (not shown).

Connecting portion 204 includes a forward clip face 206 and a rear clip face 208. A channel 210 extends between forward clip face 206 and rear clip face 208. Channel 210 is sized to allow a lower portion of lens 72 be inserted therein so that connecting portion 204 releasably connects sun glare reducer 200 to the bottom portion of lens 70. Channel 210 extending between forward clip face 206 and rear clip face 208 can have a width slightly less than the thickness of lens 70 such that forward clip face 206 and rear clip face 208 are biased at least slightly away from lens 70, resulting in a clamping effect on lens 70.

While lens 70 is shown in FIGS. 4 and 5 is not having a frame, those skilled in the art will recognize that a frame (not shown) can surround lens 70 without detracting from the use of the present invention.

Similar to sun glare reducer 100, sun glare reducer 200 can be black in order to maximize light absorption and reduce sun glare to the user. Further, similar to sun glare reducer 100, sun glare reducer 200 can be provided in sports team colors and/or include indicia on the surface thereof.

Figure 6:
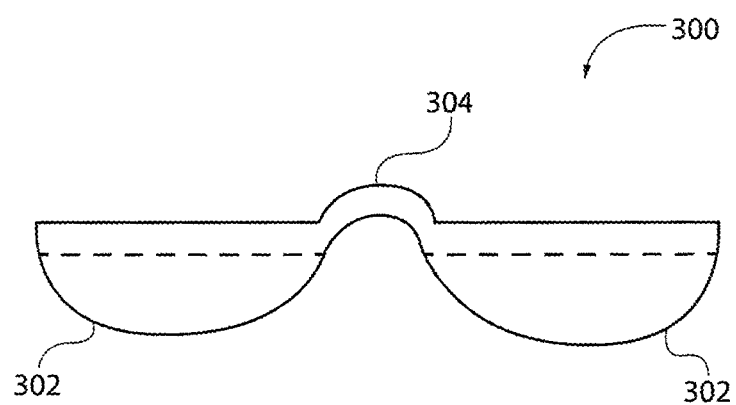
FIG. 6 shows a front elevational view of a glare reducer according to a third exemplary embodiment of the present invention.

A third embodiment of a sun glare reducer 300 according to the present invention is shown in FIG. 6. Sun glare reducer 300 is similar to sun glare reducer 200, except that sun glare reducer 300 includes two absorbing surfaces 302 (one for each lens on a pair of eyeglasses, not shown) that are connected to each other by a nose bridge 304. Similar to nose bridge 136 as discussed above, nose bridge 304 nose bridge 304 can include nose pads that rest on user's nose 60 to provide additional comfort to user 50.

Figure 7:
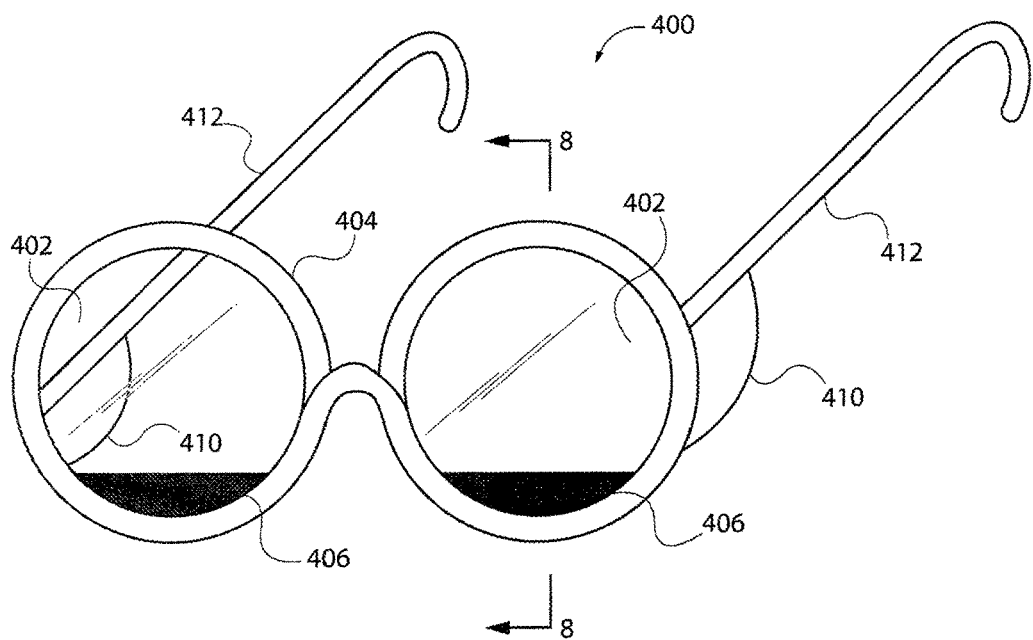
FIG. 7 shows a perspective view of a glare reducer according to a fourth exemplary embodiment of the present invention.
Figure 8:
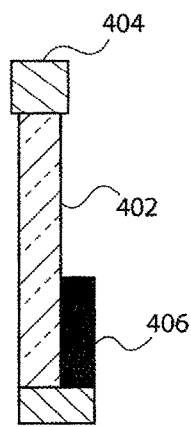
FIG. 8 shows a sectional view of the glare reducer of FIG. 7, taken along lines 8-8 of FIG. 7.

A fourth embodiment of a sun glare reducer 400 according to the present invention is shown in FIGS. 7 and 8. Sun glare reducer 400 includes a pair of lenses 402 mounted on a frame 404. A lower portion 406 of frame 404 extends upwardly and obscures a lower portion of each of lenses 402. Lower portion 406 extends only sufficiently high enough up frame 404 to simulate eye black and not too high so as to interfere with the vision of the user.

While, as shown in FIG. 8, lower portion 406 of frame 404 extends behind lens 402, those skilled in the art will recognize that lower portion 406 of frame 404 can alternatively extend in front of lens 402. Optionally, indicia (not shown) can be printed on lower portion 406.

Lower portion 406 can be a single color, such as, for example, black, in order to absorb a maximum amount of sunlight and reduce glare to a user's eyes. Alternatively, lower portion 406 can be a different color, or multiple colors, such as, for example, a sporting team's colors.

Figure 9:
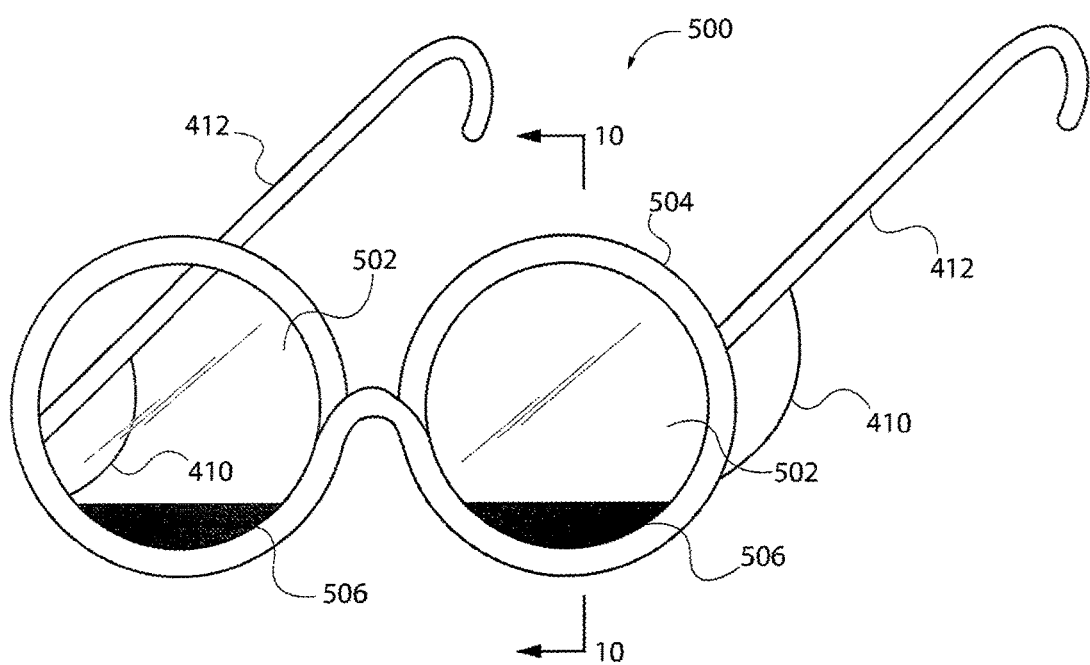
FIG. 9 shows a perspective view of a glare reducer according to a fifth exemplary embodiment of the present invention.
Figure 10:
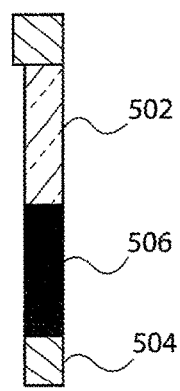
FIG. 10 shows a sectional view of the glare reducer of FIG. 9, taken along lines 10-10 of FIG. 9.

A fifth embodiment of a sun glare reducer 500 according to the present invention is shown FIGS. 9 and 10. Sun glare reducer 500 includes a pair of lenses 502 mounted on a frame 504. A lower portion 506 of each lens 502 is opaque and obscures the transmission of light through lower portion 506 of each of lenses 502. Lower portion 506 extends only sufficiently high enough up lens 502 to simulate eye black and not too high so as to interfere with the vision of the user. Optionally, indicia (not shown) can be printed on lower portion 506.

Lower portion 506 can be a single color, such as, for example, black, in order to absorb a maximum amount of sunlight and reduce glare to a user's eyes. Alternatively, lower portion 506 can be a different color, or multiple colors, such as, for example, a sporting team's colors.

Figure 11:
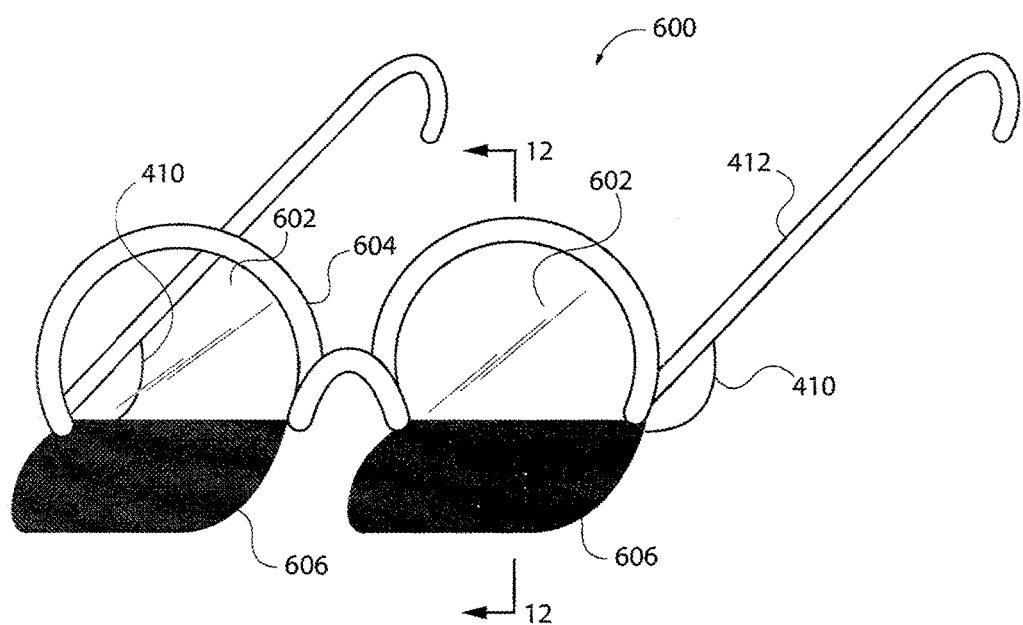
FIG. 11 shows a perspective view of a glare reducer according to a sixth exemplary embodiment of the present invention.
Figure 12:
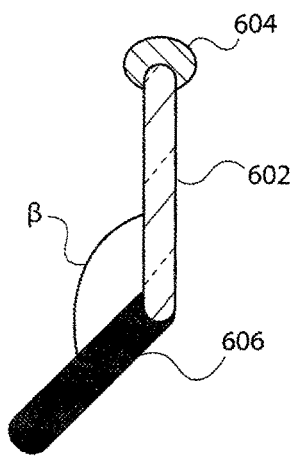
FIG. 12 shows a sectional view of the glare reducer of FIG. 11, taken along lines 12-12 of FIG. 11.

A sixth embodiment of a sun glare reducer 600 according to the present invention is shown FIGS. 11 and 12. Sun glare reducer 600 includes a pair of lenses 602 mounted on a frame 604. A lower portion 606 of each lens 602 is opaque and obscures the transmission of light through lower portion 606 of each of lenses 602. As shown in FIG. 12, lens 602 extends along a first plane, while lower portion 606 extends along a second plane, at an angle $\beta$ relative to the first plane. In an exemplary embodiment, angle $\beta$ can be between about 120° and 150°.

Lower portion 606 can be a single color, such as, for example, black, in order to absorb a maximum amount of sunlight and reduce glare to a user's eyes. Alternatively, lower portion 606 can be a different color, or multiple colors, such as, for example, a sporting team's colors.

Figure 13:
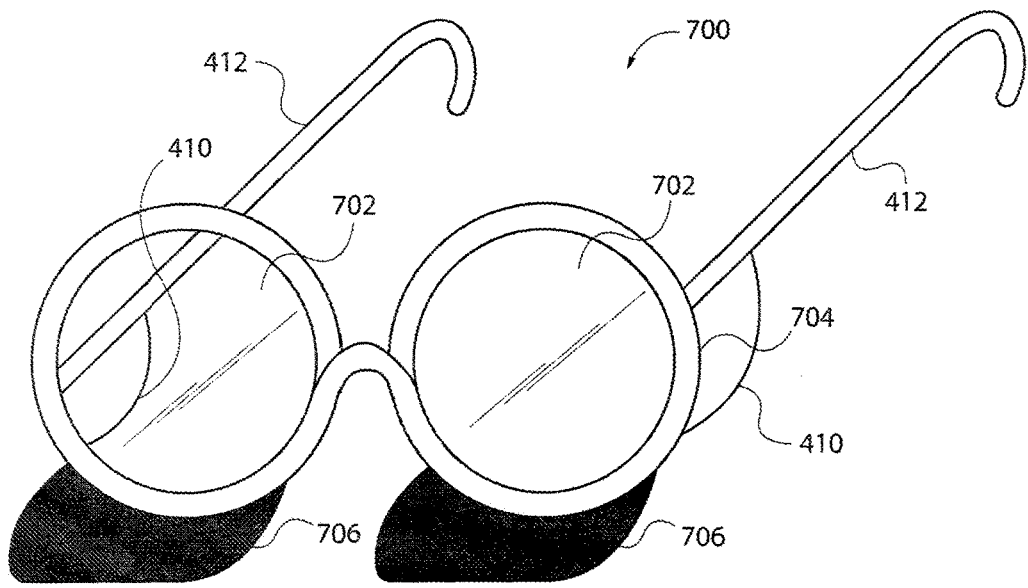
FIG. 13 shows a perspective view of a glare reducer according to a seventh exemplary embodiment of the present invention.
Figure 14:
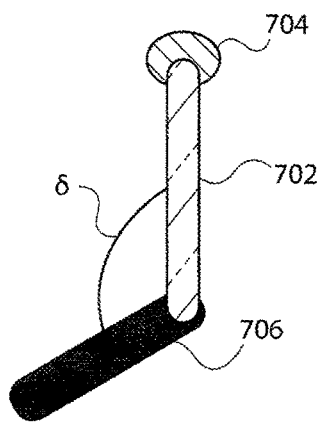
FIG. 14 shows a sectional view of the glare reducer of FIG. 13, taken along lines 14-14 of FIG. 13.

A seventh embodiment of a sun glare reducer 700 according to the present invention is shown FIGS. 13 and 14. Sun glare reducer 700 includes a pair of lenses 702 mounted on a frame 704. A lower portion 706 of frame 704 extends below and away from each lens 702. As shown in FIG. 14, lens 702 extends along a first plane, while lower portion 706 extends along a second plane, at an angle $\delta$ relative to the first plane. In an exemplary embodiment, angle $\delta$ can be between about 120° and 150°. Optionally, indicia (not shown) can be printed on lower portion 706.

Lower portion 706 can be a single color, such as, for example, black, in order to absorb a maximum amount of sunlight and reduce glare to a user's eyes. Alternatively, lower portion 706 can be a different color, or multiple colors, such as, for example, a sporting team's colors.

Figure 15:
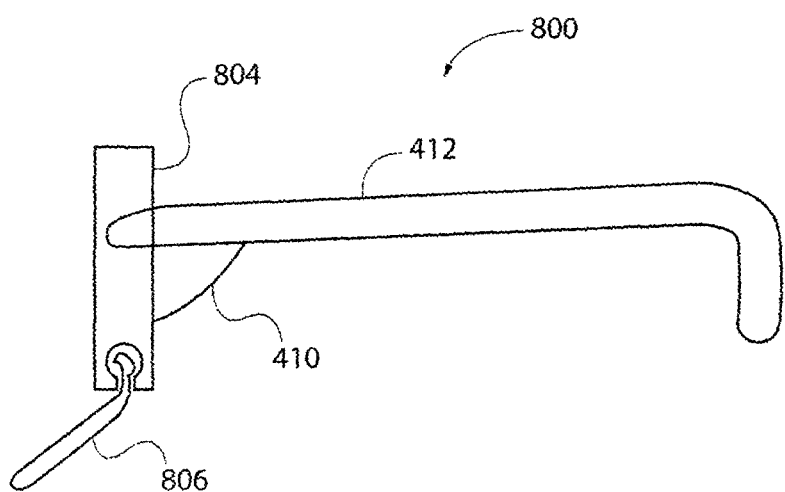
FIG. 15 shows a side elevational view of a glare reducer according to an eighth exemplary embodiment of the present invention.

An eighth embodiment of a sun glare reducer 800 according to the present invention is shown in FIG. 15. Sun glare reducer 800 looks like sudden glare reducer 700, but, while lower portions 706 are fixedly connected to their respective portion of frame 704, as shown FIG. 15, frame 804 includes a receiver that releasably accept lower portion 806 to be slid thereinto. An exemplary connection type may be a tongue and groove connection as shown FIG. 15, or other connection as known to those skilled in the art. In this manner, if the user desires not to use lower portion 806, lower portion 806 can be removed from frame 804.

Optionally, as shown in FIGS. 7, 9, 11, 13, and 15, side glare reducers 410 can be incorporated onto templar portions 412 on each of glare reducers 400, 500, 600, 700, 800, and 900. Similar to the glare reducers described above, side glare reducers can include indicia printed thereon and/or be in different colors, such as, for example, team colors.

Figure 16:
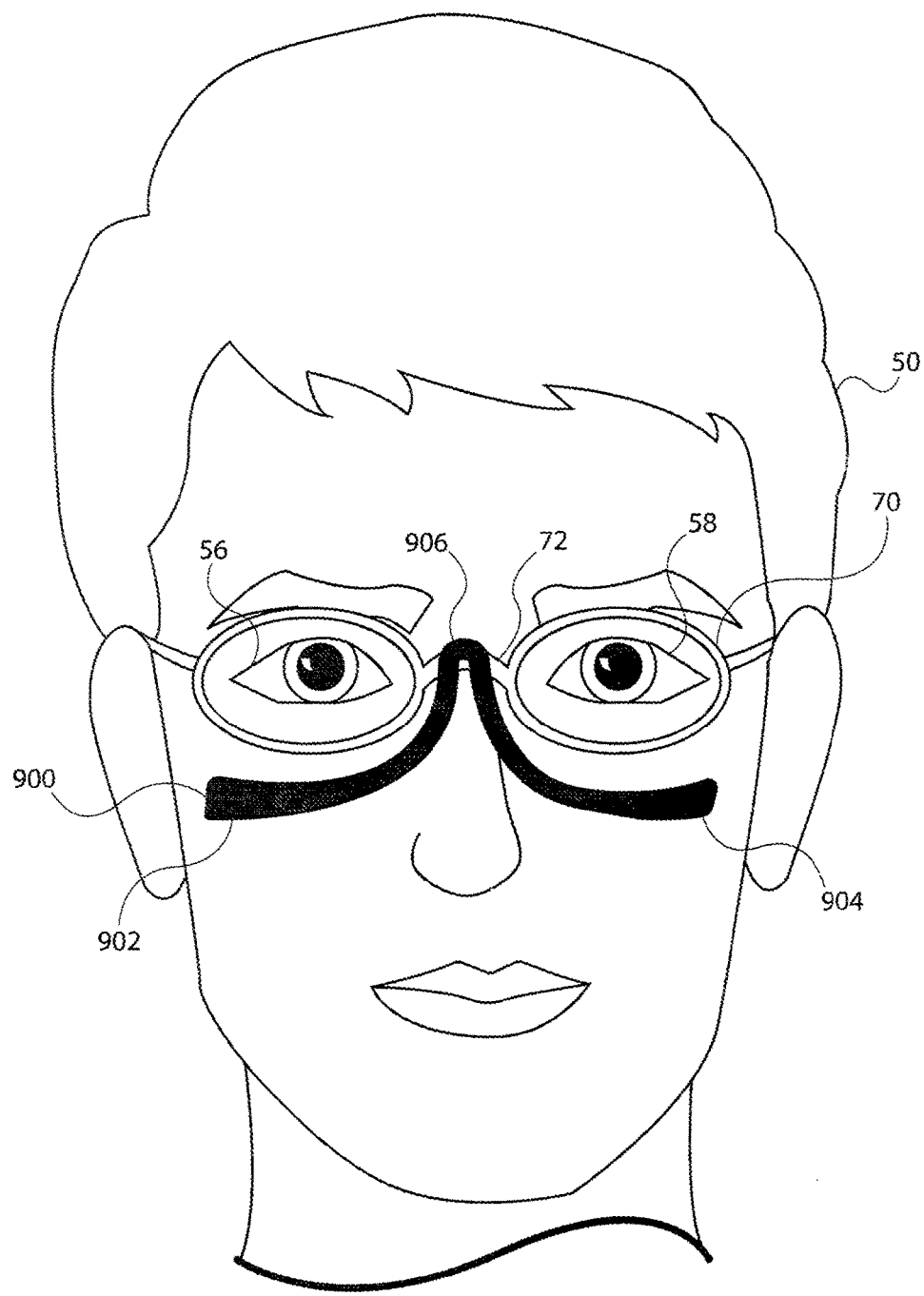
FIG. 16 shows a front elevational view of a glare reducer according to a ninth exemplary embodiment of the present invention.

A ninth embodiment of a glare reducer 900 according to the present invention is shown in FIG. 16. Glare reducer 900 can be removably attached to the nose bridge 72 of a conventional pair of glasses 70 worn by a user 50. Glare reducer 900 includes a right wing 902 and a left wing 904 that extend downward from a central attachment location 906, under the right eye 56 and left eye 58, respectively, of the user. Central attachment location 906 can incorporate an adhesive, a releasable clip that clips onto nose bridge 72, or other suitable releasable attachment mechanism.

Similar to glare reducers close above, wings 902, 904 can be a single color, such as, for example, black, in order to absorb a maximum amount of sunlight and reduce glare to a user's eyes. Alternatively, wings 902, 904 can be a different color, or multiple colors, such as, for example, a sporting team's colors.

For all of sun glare reducers 100-900 according to the present invention, the sun glare reducing element can be a single layer of light absorbing material. Alternatively, the sun glare reducing element can incorporate a light absorbing material incorporated into a substrate. By way of example only, the light absorbing material may be concrete dust embedded in a substrate, although those skilled in the art will recognize that other light absorbing material can be used.

Referring to FIGS. 17-20, a pair of eye black glasses 1000 according to a tenth exemplary embodiment of the present invention is shown. Glasses 100 include a frame 1100 that supports eye black pads 1200, 1220 that extend downwardly from below a lens portion 1120 of frame 1100. Lens portion 1120 includes a left frame portion 1140, a right frame portion 1160, and a nose bridge 1180 connecting left frame portion 1140 and right frame portion 1160 to each other. Eye black pads 1200, 1220 are light absorbing surfaces that reduce the reflection of sunlight into the eyes of user 50.

A left temple arm 1300 extends from left frame portion 1140 and a right temple arm 1320 extends from right frame portion 1160. Left temple arm 1300 may be hingedly connected to left frame portion 1140 so that left temple arm 1300 can pivot with respect to frame 1100. Alternatively, left temple arm 1300 may be fixedly connected to left frame portion 1140 so that left temple arm 1300 extends about 90° from a plane defined by frame 1100. Similarly, right temple arm 1320 may be hingedly connected to right frame portion 1160 so that right temple arm 1320 can pivot with respect to frame 1100. Still alternatively, right temple arm 1320 may be fixedly connected to right frame portion 1160 so that right temple arm 1300 extends about 90° from a plane defined by frame 1100 and generally parallel to left temple arm 1300.

Figure 17:
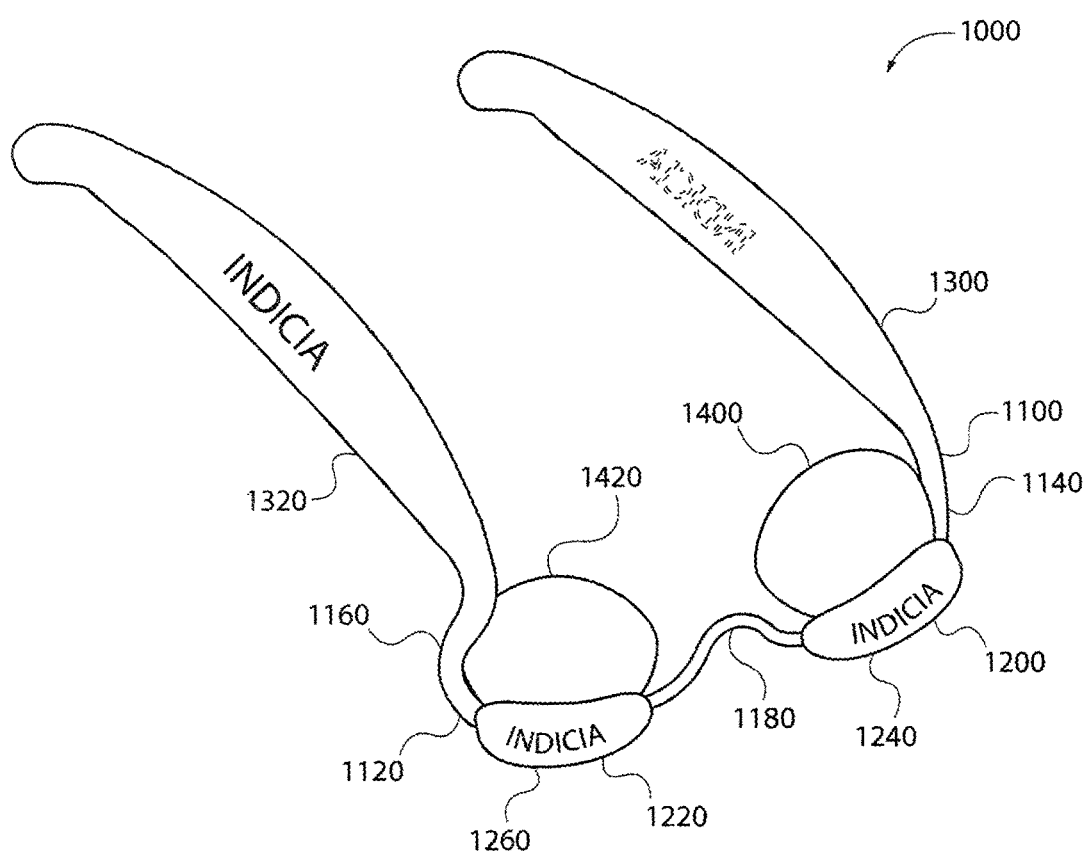
FIG. 17 shows a perspective view of a pair of eye black glasses according to a tenth exemplary embodiment of the present invention.
Figure 17A:
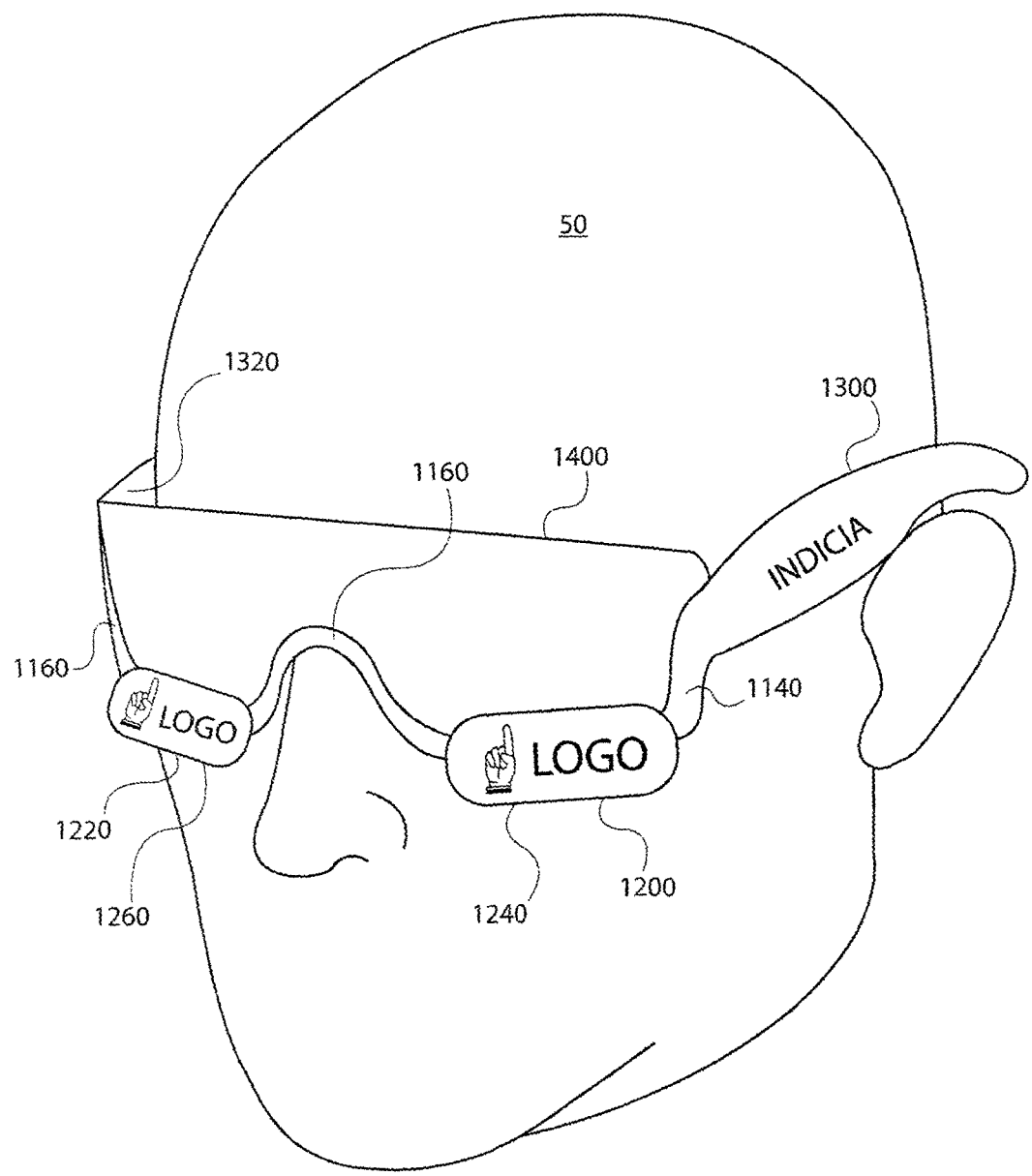
FIG. 17A shows a perspective view of the eye black glasses shown in FIG. 17 being worn on a user.

As shown in FIG. 17, left frame portion 1140 may include a left lens 1400 fixedly connected thereto and right frame portion 1160 may include a right lens 1420 fixedly connected thereto. Alternatively, as shown in FIG. 17A, left lens 1400 may extend over right frame portion 1160 so that only one lens is used. Still alternatively, however, (as shown in FIG. 1 with respect to frame 100) lenses may be omitted from the frame entirely.

Eye black pads 1200, 1220 can function as the equivalent of eye black grease that athletes occasionally apply beneath their eyes to absorb sunlight and reduce glare. Eye black pads 1200, 1220 can be a variety of shapes, such as, generally elongate or arcuate to follow the contour of the eye. Alternatively, eye black pads 1200, 1220 can have defined geometric shapes, such as, for example, a football, a baseball, a baseball bat, or other piece sports equipment.

Eye black pads 1200, 1220 can be black in color, or, alternatively, eye black pads 1200, 1220 can be colors other than black and eye black pad 1200 can be a different color from eye black pad 1220. For example, for a sports team whose colors are red and white, eye black pad 1200 can be red and eye black pad 1220 can be white. Additionally/ alternatively, indicia, such as, for example, a team name and/or logo can be printed on eye black pads 1200, 1220.

Alternatively, indicia on eye black pads 1200, 1220 can be polarized so that one color/indicia can be viewed when looking at eye black pads 1200, 1220 from a first angle, such as, from the left of user 50, and that another color/indicia can be viewed when looking at eye black pads 1200, 1220 from a second angle, such as, from the right of user 50.

Figure 18:
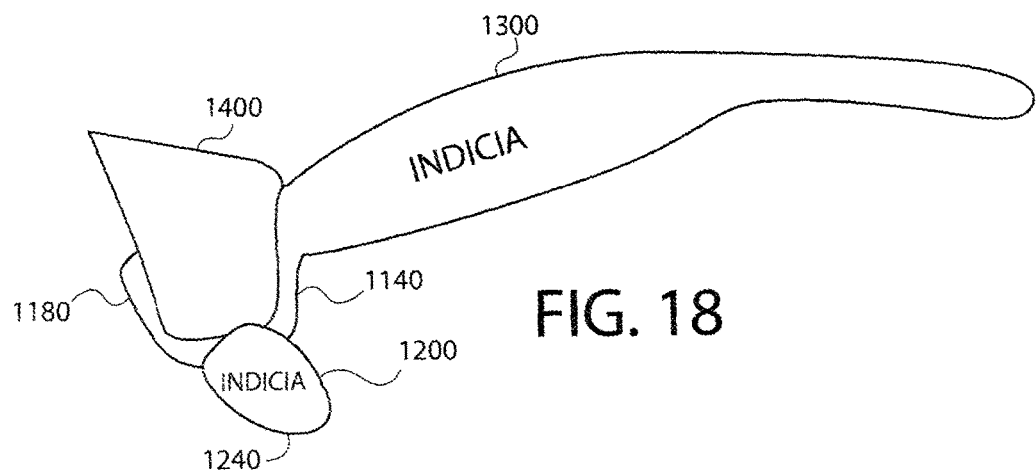
FIG. 18 shows a side elevational view of the eye black glasses shown in FIG. 17.
Figure 19:
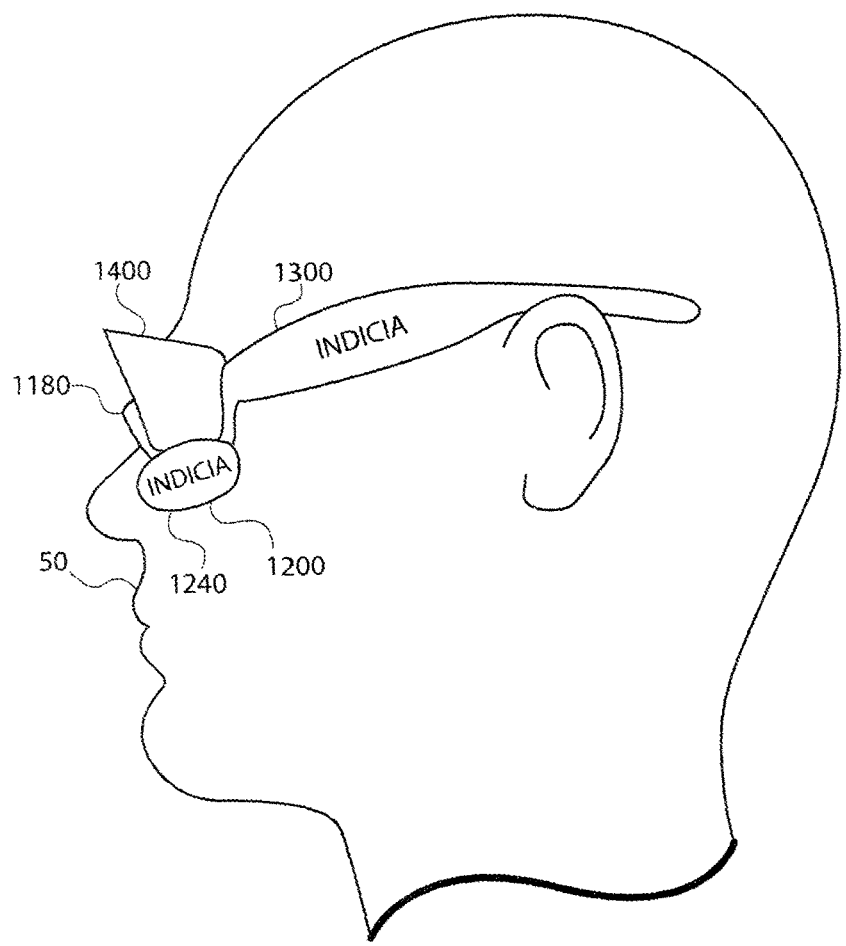
FIG. 19 shows a side elevational view of the eye black glasses shown in FIG. 17, being worn by a user.

As shown in the side view of glasses 1000, shown in FIG. 18, eye black pads 1200, 1220 can be mounted on frame 1100 so that eye black pads 1200, 1220 are biased inwardly. That way, when glasses 1000 are worn by a user 50, a lower edge 1240, 1260, respectively, of each of eye black pads 1200, 1220 engages user 50 and are biased outwardly, as shown in FIG. 19, resulting in lower edges 1240, 1260 of eye black pads 1200, 1220 maintaining a positive contact with user 50.

Figure 18A:
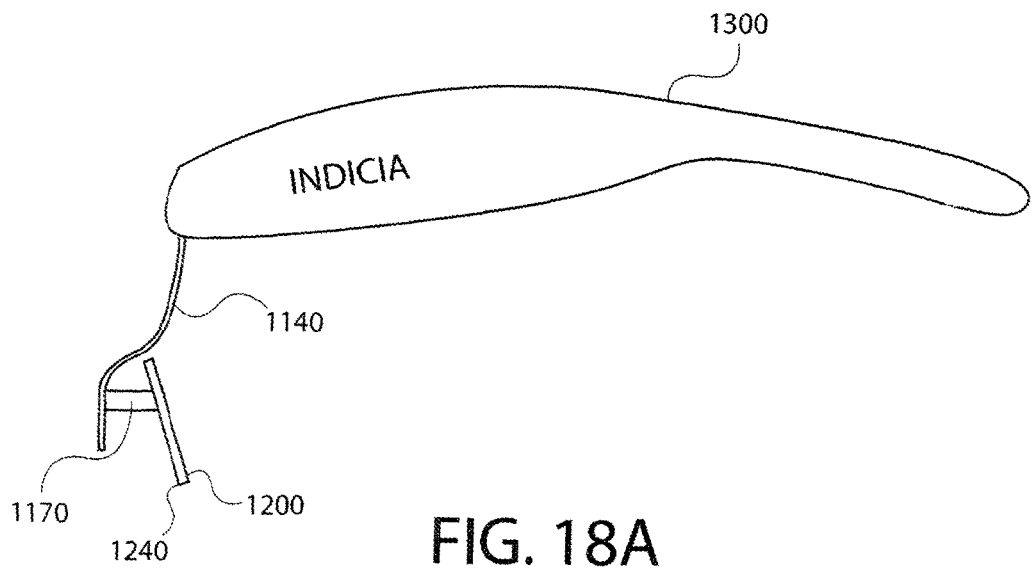
FIG. 18A shows a side elevational view of an alternative exemplary embodiment of the eye black glasses shown in FIG. 17.
Figure 18B:
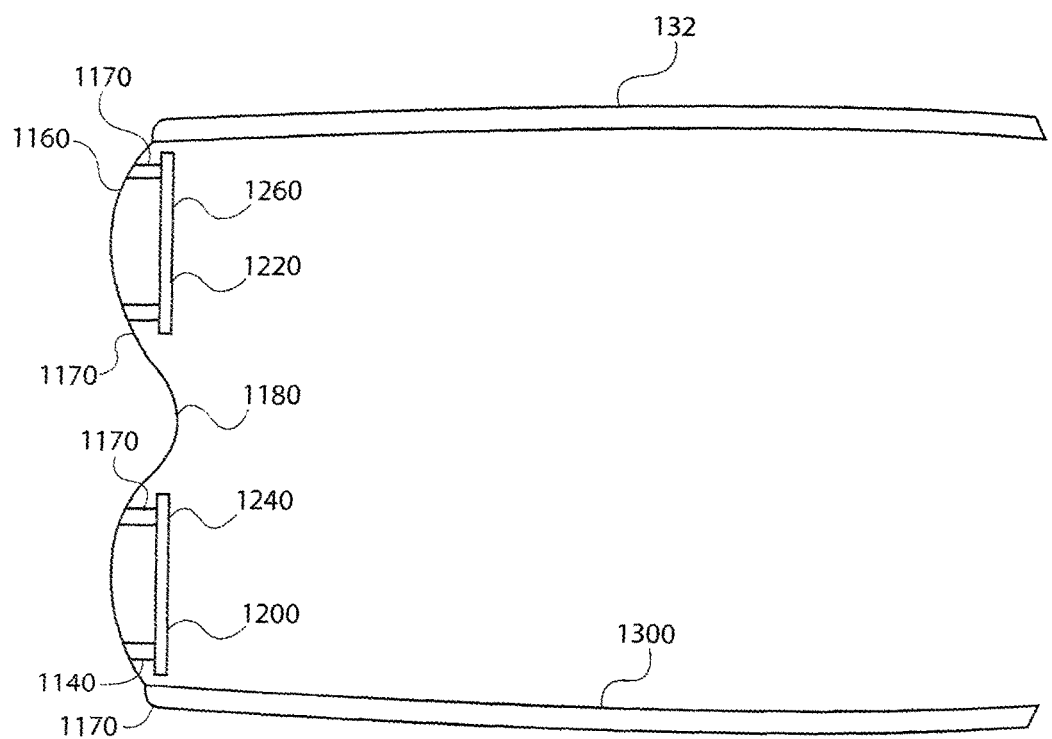
FIG. 18B a top plan view of the eye black glasses shown in FIG. 18A.

An alternative biasing mechanism is shown in FIGS. 18A and 18B. Eye black pads 1200, 1220 are connected to left and right frame portions 1140, 1160, respectively by an active biasing mechanism, such as, for example, springs 1170. Springs 1170 actively bias eye black pads 1200, 1202 toward the user's face (toward the right as shown FIGS. 18A and 18B). Similarly to the embodiments disclosed, above, when glasses 1000 are worn by a user 50, lower edge 1240, 1260, respectively, of each of eye black pads 1200, 1220 engages user 50 and are biased outwardly, resulting in lower edges 1240, 1260 of eye black pads 1200, 1220 maintaining a positive contact with user 50, with eye black pads 1200, 1220 resting flush against the upper cheeks of user 50.

Referring back to FIG. 17, each of temple arm 1300, 1320 may also include indicia printed thereon. Such indicia may, for example, include the team name and/or logo, and/or advertising. Similar to eye black pads 1200, 1220, temple arms 1300, 1320 indicia on temple arms 1300, 1302 can be polarized so that one color/indicia can be viewed when looking at temple arms 1300, 1320 from a first angle, such as, from the front of user 50, and that another color/indicia can be viewed when looking at temple arms 1300, 1320 from a second angle, such as, from the rear of user 50.

Figure 20:
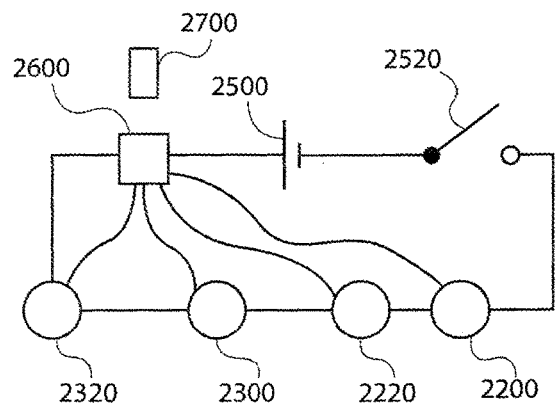
FIG. 20 shows an exemplary electrical schematic for use with a pair of eye black glasses according to an eleventh exemplary embodiment of the present invention.

In an alternative embodiment of glasses 2000 according to the present invention, glasses 2000 can include electrical power to provide electrically powered indicia on eye black pads 2200, 2220 and/or temple arms 2300, 2320. An exemplary electrical schematic is shown in FIG. 20, with glasses 2000 shown in FIG. 21. A battery 2500 and an On/Off switch 2520 can be mounted in one of temple arm 2300, 2320, distal from frame 2100. Battery 2500 can be permanently mounted in the one of temple arm 2300, 2320, or, alternatively, battery 2500 can be removably inserted into the one of temple arm 2300, 2320. Battery 2500 can be electrically coupled to display screens on eye black pads 2200, 2220 and/or temple arms 2300, 2320 in order to power the indicia when On/Off switch 2520 is switched to the "On" position. Eye black pads 2200, 2220 and/or temple arms 2300, 2320 can also include lights that can illuminate when powered by battery 2500. The lights can be a single color, multicolor, and/or alternating colors.

Glasses 2000 can also include a processor 2600 that can be mounted in the other of temple arm 2300, 2320 and electrically connected to battery 2500, as well as electronically connected to display screens on eye black pads 2200, 2220 and/or temple arms 2300, 2320 so that the displayed indicia can change over time.

Figure 21:
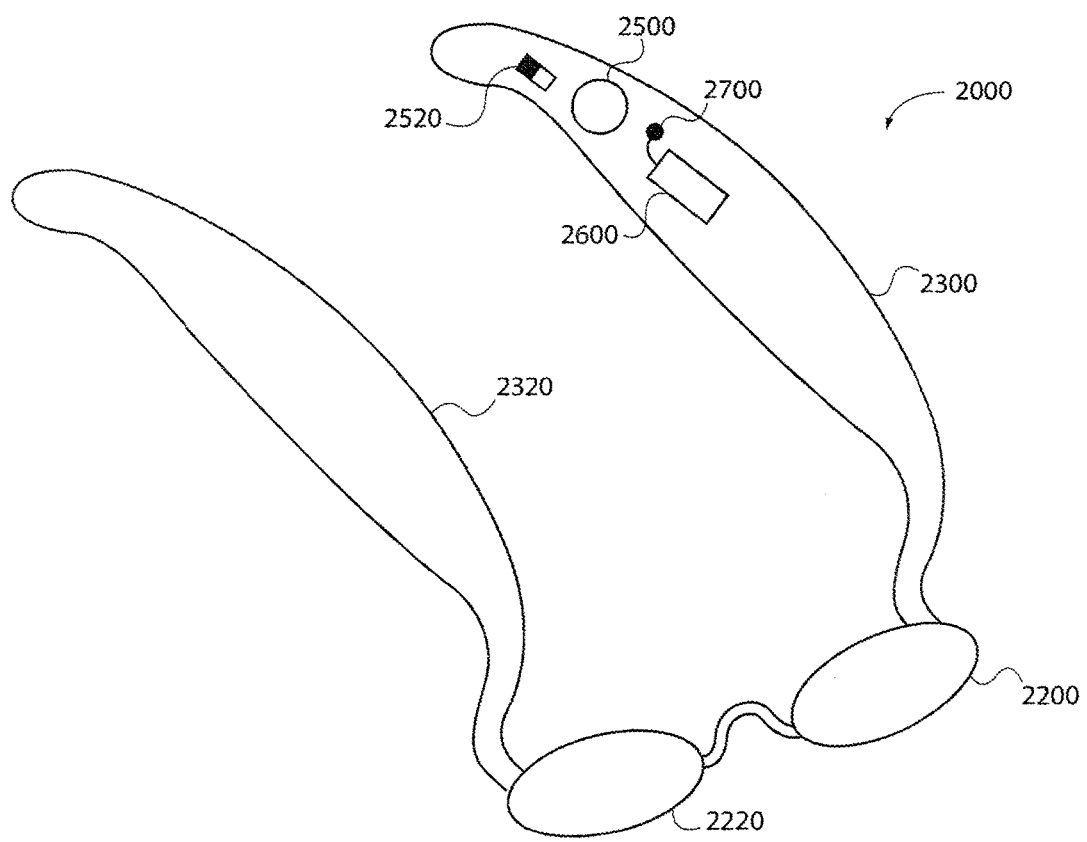
FIG. 21 shows the pair of eye black glasses according to a twelfth exemplary embodiment of the present invention.
Figure 22:
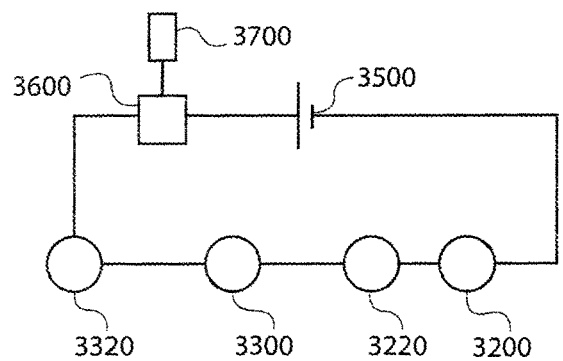
FIG. 22 shows an exemplary electrical schematic for use with a pair of eye black glasses according to a thirteenth exemplary embodiment of the present invention.
Figure 23:
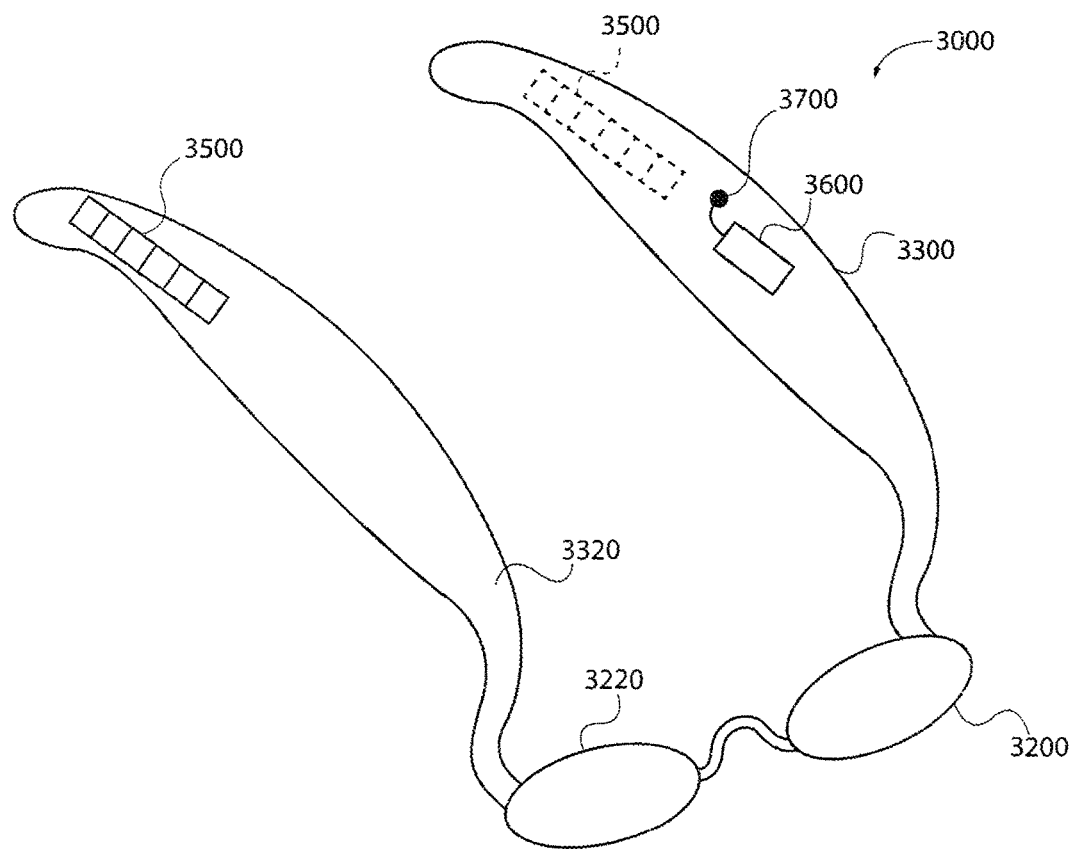
FIG. 23 shows the pair of eye black glasses according to a fourteenth exemplary embodiment of the present invention.

Instead of battery 2500, in an alternative embodiment, shown in FIGS. 21 and 22, glasses 3000 can include solar cells 3500 that are mounted on temple arms 3300, 3320. Solar cells 3500 are electrically connected to a processor 3600 and to display screens on eye black pads 3200, 3220 and/or temple arms 3300, 3320 in order to power electrically powered indicia on eye black pads 3200, 3220 and/or temple arms 3300, 3320.

Either/both of glasses 2000, 3000 can include a receiver 2700, 3700 electrically coupled to processor 2600, 3600, respectively. Receiver 2700, 3700 can be a wireless receiver configured to receive electronic signals from a wireless transmitter (not shown), located in the vicinity of glasses 2000, 3000, such as, for example, from the user's personal electronic device (cell phone, computer pad, etc.) or in an athletic stadium when glasses 2000, 3000 are being worn for an athletic event. The transmitter can transmit wireless electronic signals that are picked up by wireless receiver 2700, and transmitted the processor 2600, 3600. Processor 2600, 3600 then transmits appropriate signals to the display screens on eye black pads 2200, 2220 and/or temple arms 2300, 2320 for glasses 2000 or to eye black pads 3200, 3220 and/or temple arms 3300, 3320 for glasses 3000. The transmitter can change the signal transmitted to receiver 2700 based on different conditions such as, for example, when a team scores, after a predetermined period of time, or other predetermined parameters, resulting in changes in the displays. If a large number of people within the stadium are wearing glasses 2000, 3000, all of glasses 2000, 3000 can generate the same displays simultaneously.

Alternatively, receiver 2700, 3700 can be a "plug-in" receiver, such as, for example, a micro USB port in which the transmitter can be an electronic device (cell phone, computer pads, etc.) that is hardwired directly to receiver 2700, 3700, providing a cable connection to glasses 2000, 3000. With this connection, the user can directly program the indicia to be displayed on glasses 2000, 3000.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A sun glare reducer comprising:
    a right templar portion and a left templar portion, wherein each of the right templar portion and the left templar portion includes an elongate member having a first free end and a second connected end that connects the elongate member to a facial portion;
    a facial portion extending between the right templar portion and the left templar portion, wherein the facial portion includes a right under-portion that extends inwardly toward a center of the facial portion from the right templar portion and a left under-portion that extends inwardly toward a center of the facial portion from the left templar portion; and
    a light absorbing surface extending outwardly away from each of the right under-portion and the left under-portion.

2. The sun glare reducer according to claim 1, further comprising at least one lens extending between the right templar portion and the left templar portion.

3. The sun glare reducer according to claim 2, wherein the light absorbing surface is located below the at least one lens.

4. The sun glare reducer according to claim 1, wherein the light absorbing surface comprises a light absorbing surface extending from each of the right under-portion and the left under-portion.

5. The sun glare reducer according to claim 4, wherein each light absorbing surface comprises a biasing mechanism adapted to bias the light absorbing surface toward a user's face when the sun glare reducer is worn by the user.

6. The sun glare reducer according to claim 1, wherein the light absorbing surface comprises an indicia visible thereon.

7. The sun glare reducer according to claim 6, wherein the indicia is electronically generated.

8. The sun glare reducer according to claim 1, wherein at least one of the right templar portion and the left templar portion comprises an electronically generated indicia visible thereon.

9. The sun glare reducer according to claim 8, wherein the electronically generated indicia is transmitted from an electronic device.

10. The sun glare reducer according to claim 9, wherein the indicia is wirelessly transmitted.

11. The sun glare reducer according to claim 9, wherein the indicia is transmitted via a cable connection.

12. The sun glare reducer according to claim 8, further comprising a power source mounted in at least one of the right templar portion and the left templar portion, wherein the power source is electrically connected to the electronically generated indicia.

13. A sun glare reducer comprising:
    a right templar portion;
    a left templar portion;
    a frame extending between the right templar portion and the left templar portion, the frame having a right under-portion coupled to the right templar portion and a left under-portion coupled to the left templar portion;
    a right light absorbing surface connected to the right under-portion; and
    a left light absorbing surface connected to the left under-portion,
    wherein each of the right light absorbing surface and the left light absorbing surface comprises electronically generated indicia.

14. The sun glare reducer according to claim 13, further comprising a single lens connected to the frame between the right templar portion and the left templar portion.

15. The sun glare reducer according to claim 13, further comprising a right lens connected to the right under-portion and a left lens connected to the left under-portion.

16. The sun glare reducer according to claim 13, wherein the electronically generated indicia changes between a first indicia and a second indicia.

17. The sun glare reducer according to claim 13, further comprising a power source mounted in at least one of the right templar portion and the left templar portion, wherein the power source is electrically connected to the electronically generated indicia.

18. The sun glare reducer according to claim 17, wherein the power source comprises a solar cell.

19. The sun glare reducer according to claim 17, wherein the power source comprises a battery.

* * * * *